United States Patent [19]

Tozer

[11] Patent Number: 5,365,976
[45] Date of Patent: Nov. 22, 1994

[54] APPARATUS FOR STOPPING THE FLOW OF NATURAL GAS

[76] Inventor: Peter Tozer, 115 Barrett Court, Apt. 907, Kingston, Ontario, Canada, K7L 5H6

[21] Appl. No.: 884,016

[22] Filed: May 18, 1992

[30] Foreign Application Priority Data

Jun. 3, 1991 [CA] Canada .................................. 2043778

[51] Int. Cl.$^5$ .......................................... F16L 55/128
[52] U.S. Cl. .......................................... 138/89; 138/94
[58] Field of Search ............................. 138/89, 90, 94; 248/316.5; 29/280; 137/317, 318, 319

[56] References Cited

U.S. PATENT DOCUMENTS

| 491,184 | 2/1893 | McCartney | 138/89 |
| 1,226,209 | 5/1917 | Harris | 138/89 |
| 1,735,330 | 11/1929 | McMahan | 138/89 |
| 1,993,307 | 3/1935 | Nicholson | 138/89 |
| 2,477,663 | 8/1949 | Sexton | 138/90 |
| 2,977,992 | 4/1961 | Jensen | 138/89 |
| 3,601,852 | 8/1971 | Bjalme | 425/393 |
| 3,993,103 | 11/1976 | Hammer | 138/89 |
| 4,349,047 | 9/1982 | Ditto et al. | 138/89 |
| 4,625,765 | 12/1986 | O'Donnell et al. | 138/89 |
| 4,687,026 | 8/1987 | Westman | 138/89 |
| 5,168,902 | 12/1992 | Hood | 138/90 |

FOREIGN PATENT DOCUMENTS 0373944  6/1932  United Kingdom .................. 138/89

Primary Examiner—David A. Scherbel
Assistant Examiner—James F. Hook
Attorney, Agent, or Firm—Baker & Daniels

[57] ABSTRACT

A device for stopping the flow of fluid under pressure from an open-ended pipe including a clamp adapted to grasp a pipe adjacent its open end. A stopper holder extends from the clamp and is alignable with the open end of the pipe. The stopper is adapted to be held by the stopper holder in a position aligned with the open end of the pipe, and adapted to be inserted from the aligned position into the pipe to stop the flow of fluid from the pipe.

13 Claims, 3 Drawing Sheets

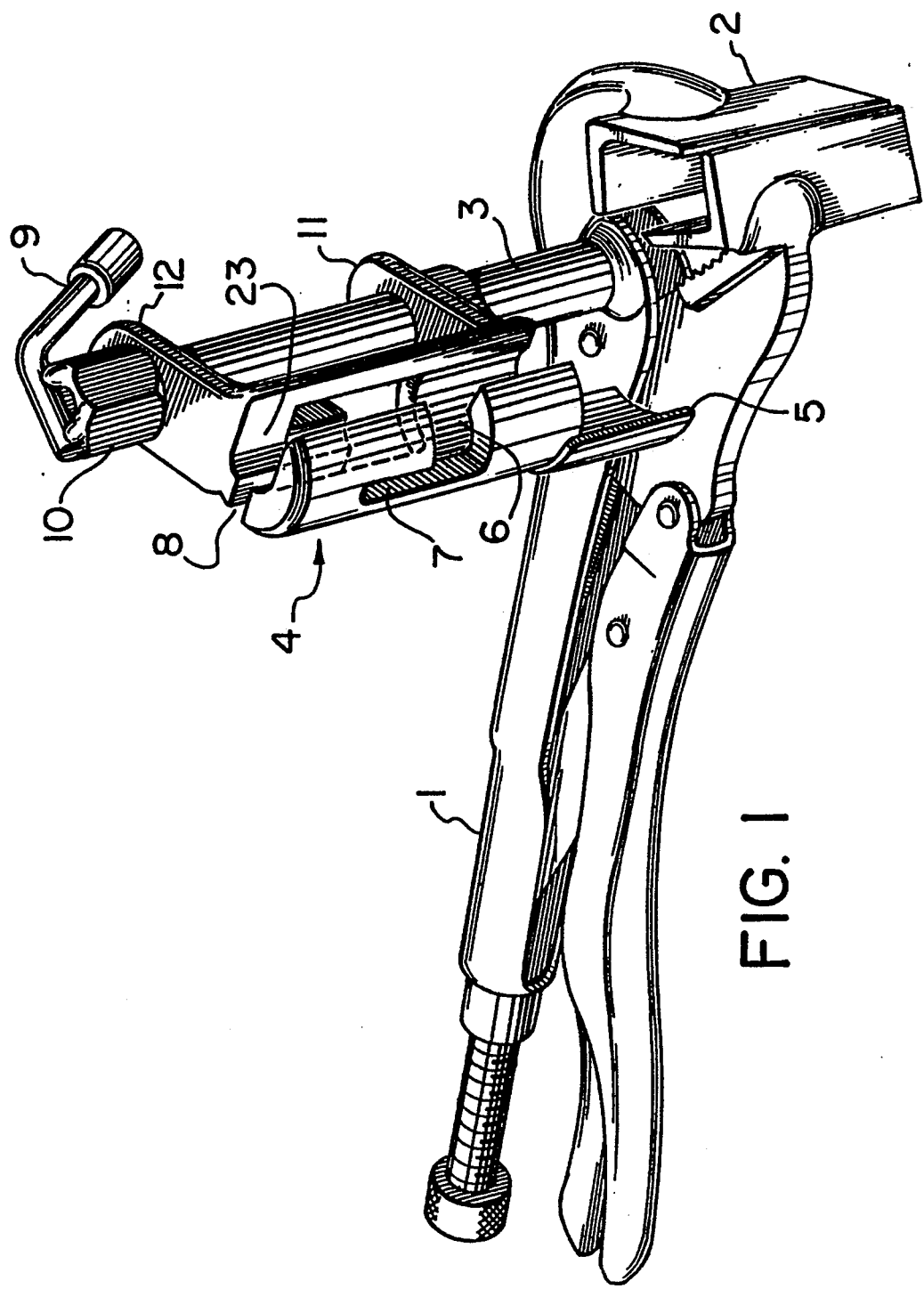
FIG. I

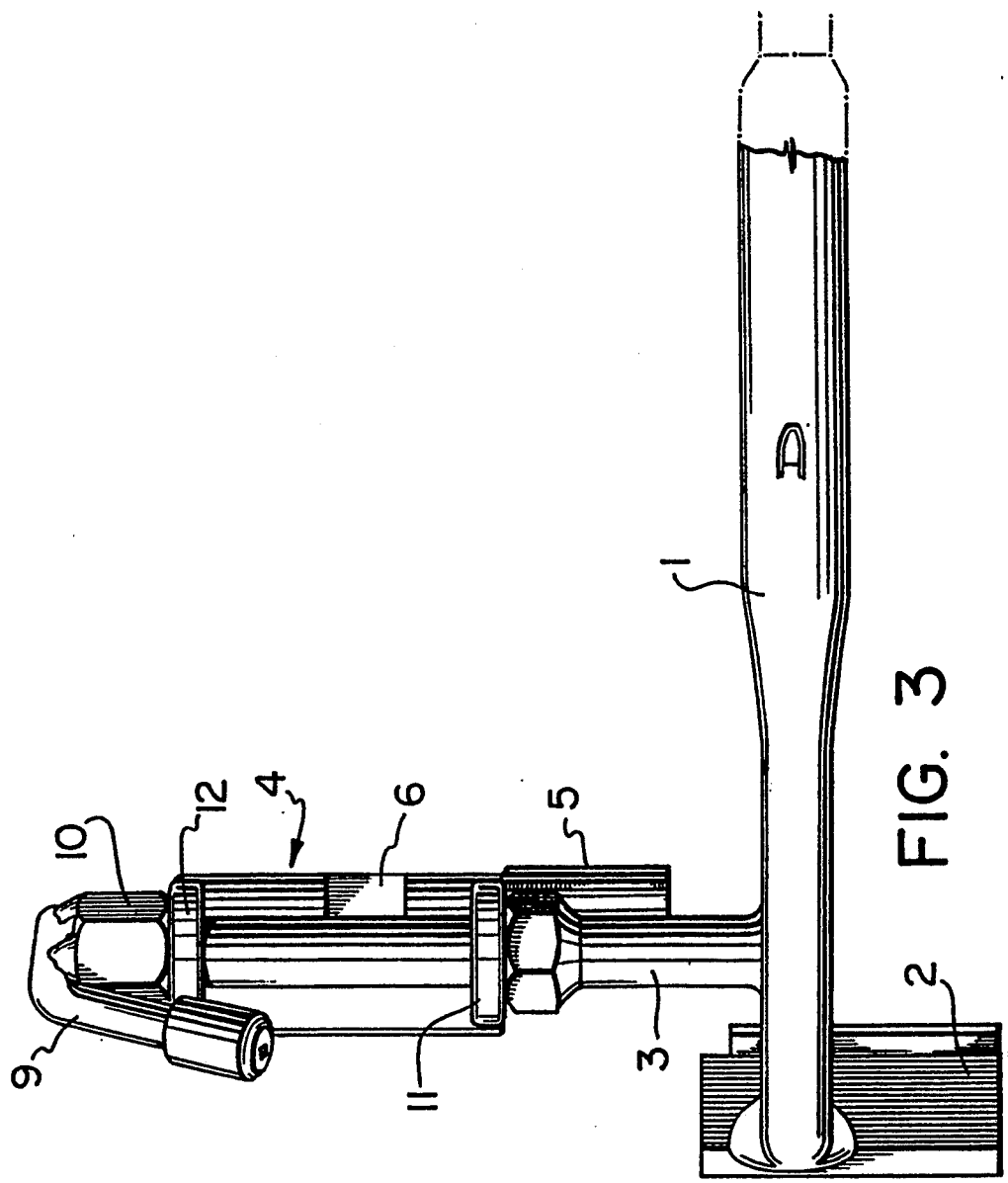
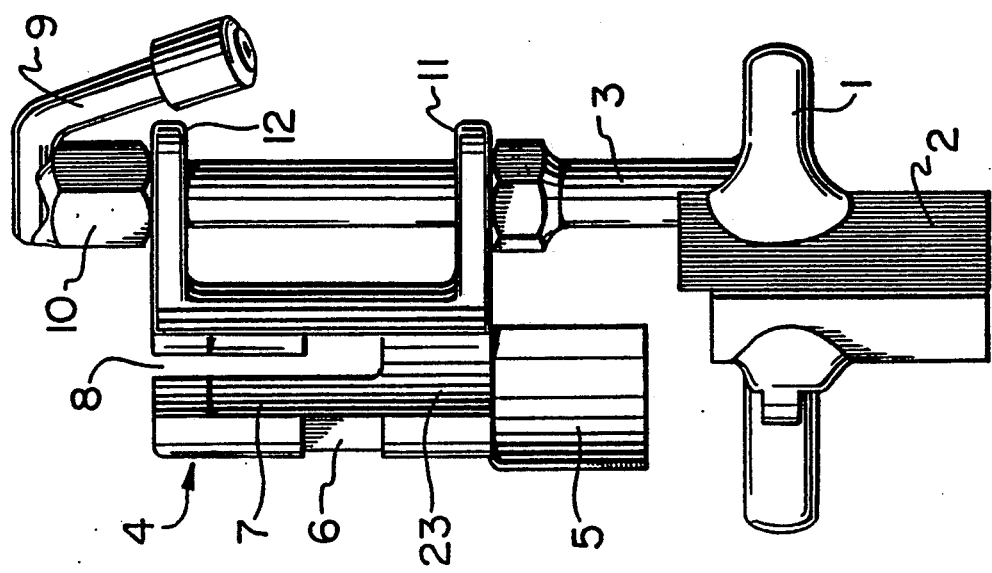

APPARATUS FOR STOPPING THE FLOW OF NATURAL GAS

The present invention relates to the field of methods and apparatus for stopping the flow of fluids under pressure from conduits. The present invention is particularly applicable to stopping the uncontrolled escape of natural gas from pressure lines.

It is often necessary, when servicing natural gas lines or responding to emergencies in residential, commercial or industrial environments, to stop the flow of gas from a pressurized line in a situation where no valve is accessible, or the only accessible valve is broken or cannot be used because shutting it would adversely affect gas flow in an adjacent line. Techniques have been developed, therefore, to stop gas flow from an open pipe.

The simplest method of stopping the flow of gas from a pressurized line is to insert a wooden plug in the open end of the pipe, and then apply strong adhesive tape, such as POLYKEN ™ tape to the pipe and the plug to hold the plug in the pipe. The disadvantages of this technique are obvious, however. It is difficult to insert a plug into a line against a strong flow of gas; the wood has a tendency to split when being inserted or driven into the line; and even though strong adhesive tape is used, the plug may pop out with dangerous effect. Also, this method is time consuming, and it is desirable to stop an uncontrollable gas flow as quickly as possible, because of the poisonous and explosive nature of natural gas.

A slightly more advanced method of stopping gas flow is by insertion of a device known as a MUELLER EXPANDO STOPPER ™. This device is a threaded rod having at one end a nut threaded thereon, a wide deformable rubber washer above the nut, the rubber washer being bracketed, top and bottom by metal washers, a sleeve above the rubber washer, and a wing nut threaded on the rod above the sleeve. The end of the rod above the wing nut is bent to form a handle. To stop a flow of gas using this device, it is inserted by hand into the gas line against the flow of pressurized gas, and held in place while the wing nut is tightened. Tightening the wing nut causes the sleeve below it to press down against the deformable rubber washer, which bulges outwardly, filling the space between it and the pipe, thereby stopping the flow of gas. Once tightened in this way, it, like a wooden plug is held in place with strong adhesive tape. The problem with this device is that it is difficult to insert into a pipe by hand, and difficult to hold in place for tightening of the wing nut, making installation of it a two person operation. Also, because outward flow of gas on the metal washer at the bottom of the rubber washer acts in a manner similar to the tightening of the wing nut, the rubber washer has a tendency, when being used in high pressure situations, to expand when being inserted, thereby foiling the efforts of service personnel.

In the event that neither of the aforementioned techniques proves effective, service personnel usually resort to squeezing off, the flow of gas by means of a hydraulic jack operated crimping tool such as a REGENT JACK. This is a time consuming operation usually taking more than half an hour, and destroys a portion of pipe,.which must thereafter be replaced.

The object of the present invention is to provide a tool that is easy to use under virtually any conditions to stop the flow of gas from a pressure line quickly and efficiently.

In a broad aspect, the present invention relates to a device for stopping the flow of fluid under pressure from an open-ended pipe including: (i) clamp means adapted to grasp said pipe adjacent its open end; (ii) stopper holder means extending from said clamp means and being alignable with the open end of said pipe; and (iii) stopper means adapted to be held by said stopper holder means in a position aligned with the open end of said pipe and insertable from said aligned position into said pipe to stop the flow of fluid from said pipe.

In drawings that illustrate the present invention by way of example:

FIG. 1 is a perspective view, partially in phantom, of the clamp means of the present invention;

FIG. 2 is a front view of the device of FIG. 1;

FIG. 3 is a side view of the device of FIG. 1;

Figure 4:
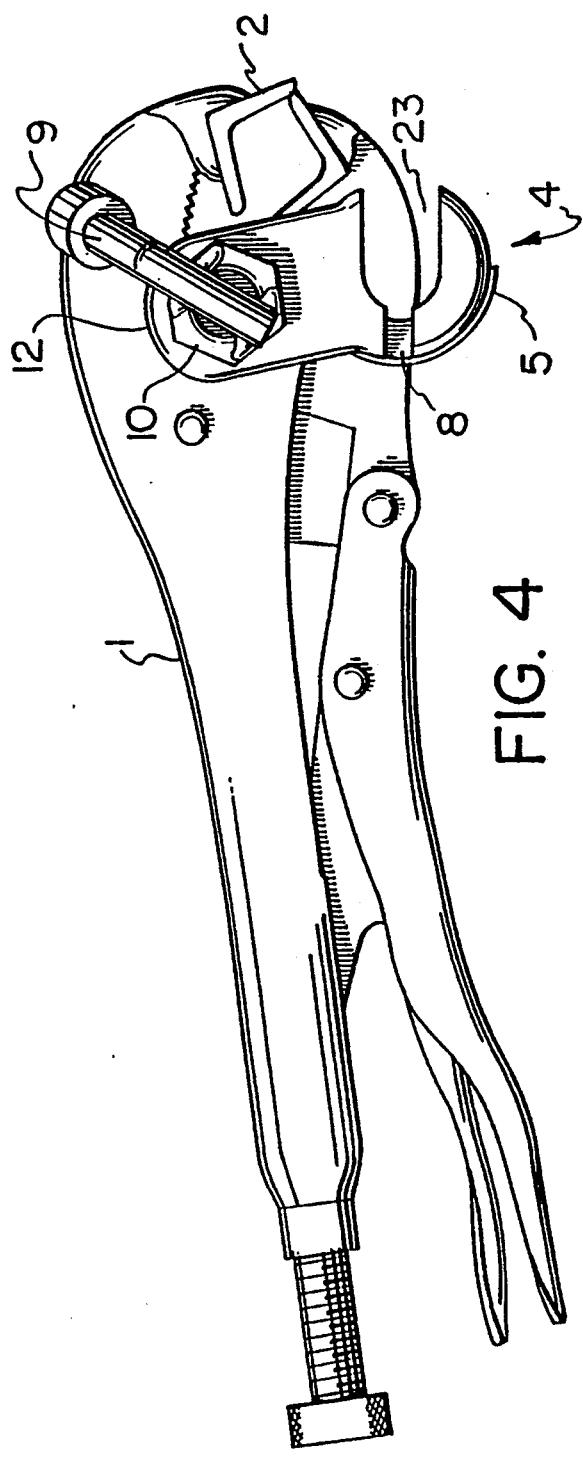
FIG. 4 is a top view of the device of FIG. 1.

Referring to FIGS. 1 to 4, the present invention provides a tool including a clamp 1 having angulated jaws 2 to grasp a pipe such as a residential natural gas pipe. As illustrated, clamp 1 is shown as a Vise-Grip ™ clamping pliers, but any suitable clamp, such as a standard C-clamp will be usable in the present invention with acceptable results. A post 3 extends generally parallel to the jaws 2 of the clamp, outwardly from one end of the clamp 1.

A stopper holder 4 is swivelly mounted on post 3 by upper and lower hinges 12, 11. Holder 4 is provided with a skirt 5 at its lowermost edge. Skirt 5 will contact the upper surface of a pipe when clamp jaws 2 are fastened thereon, and stopper holder 4 is rotated into position over the open end of the pipe. When skirt 5 contacts a pipe, the stopper (described below) will be axially aligned with the pipe.

The upper end of post 3 is threaded, and a threaded bolt 10 engages it. When holder 4 is swung into place over an open pipe, bolt 10 may then be tightened against the upper hinge 12 of holder 4 to prevent it from swivelling out of alignment with the open end of the pipe. Bolt 10 may be provided with a handle member 9, for ease of turning by a gloved repair person. If so, because it will only be possible to turn bolt 10 less than a full revolution, it is tightened almost fully against the hinge in its normal state, so that tightening fully requires only a short push of handle 9. Other quick-tightening methods for quickly securing alignment of holder 4 over the open end of the pipe will be obvious to one skilled in the art.

Holder 4 is provided with an axial bore extending its entire length. The bore is of greater diameter at the lower end of the holder, and narrows at the upper end thereof, to permit the stopper to be held in the holder against a strong flow of gas. A wide slot 23 extends the length of the holder to permit the insertion of the stopper into the holder. A second, narrow, slot 8, on the opposite side of the holder permits the passage of stopper retaining fluke 13 half-way down the bore thereof. Narrow slot 8 and wide slot 23 each have an arcuate slot 6 extending away therefrom, terminating in a short, upwardly extending retaining slot 7.

Figure 5:
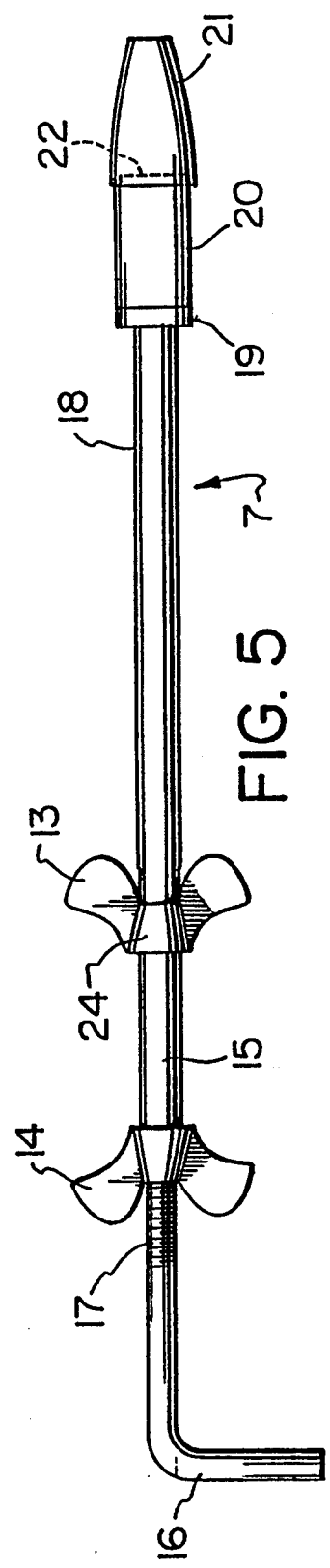
FIG. 5 is a side view of the stopper of the present invention, for use in association with the clamp means of FIG. 1.

Referring to FIG. 5, stopper 7 comprises a central threaded rod 17, having a bullet shaped bolt 21 threaded onto the lower end thereof. To prevent accidental loosening of bullet-shaped bolt 21 from the end of rod 17, the threads of rod 17 are preferably treated with a thread dope before bolt 21 is threaded onto same. The upper end of bolt 21 is recessed to form an indented seating 22 to admit the lowermost end of an expanding, deformable rubber washer 20 located just above same. Above expanding washer 20 is a steel flat washer 19, so that downward pressure on flat washer 19 will cause expanding washer 20 to be squeezed and expand. Above flat washer 19 is lower sleeve 18, and above lower sleeve 18 a collar 24 from which extend stopper retaining flukes 13. Collar 24 may be integral with sleeve 18, or it may be separate therefrom. Conveniently, collar 24 may be an inverted wing nut, with the wings serving as retaining flukes 13. It is not necessary, however, that collar 24 be threaded onto rod 17. Upper sleeve 15 extends upwardly from collar 24 a distance at least equal to and preferably greater than the distance between the upper end of holder 4 and the upper edges of arcuate slots 6, so as to permit the rotation of flukes 13 in arcuate slots 6. It will be observed that upper sleeve 15, collar 24 (with flukes 13) and lower sleeve 18 may be formed as a single unit if desired.

Above upper sleeve 15 is located nut 14 threaded onto rod 17. Nut 14 is preferably a wing nut to facilitate its being turned by a gloved worker. Rod 17 is bent above nut 14, to provide a handle 16 that may be grasped when nut 14 is turned.

The device of the present invention is used as follows to stop the flow of gas from a pipe:

i) Jaws 2 are fastened onto a pipe near the open end thereof. At this time, the stopper holder 4 will be swung away from the jaws 2, so as not to be blown by the escaping gas.

ii) The stopper is inserted into the stopper holder by slipping lower 18 sleeve through longitudinal slot 23. The stopper is then pulled up into the holder, so that the holder can be swivelled over the open end of the pipe. When the stopper is pulled up into the holder 4, flat washer 19 will contact the upper narrow part of the central bore of the holder 4;

iii) Holder 4 is then swivelled into place over the end of the pipe, so that skirt 5 contacts the side of the pipe. The stopper is then axially aligned with the pipe, and bolt 10 may be turned by handle 9 to secure the stopper holder 4 in place.

iv) The stopper is then pushed into the pipe by pushing on handle 16. The bullet-shape of the end of the stopper facilitates pushing it in against the flow of gas, and the recessed seating of expanding washer 20 in bullet shaped nut 21 prevents gas pressure from deforming expanding washer 20 by pressing on it from below.

v) As the stopper is manually pushed into, the gas line, care is taken to align flukes 13 so that they pass half way down the length of the holder via slots 8,23. At the bottom of the slots 8,23, which is detectable by the worker because a fluke 13 will impact the bottom of slot 8, flukes 13 are then manually rotated through arcuate slots 6, at which point the worker eases manual pressure on handle 16, thereby permitting flukes 13 to travel up retaining slots 7 (being pushed up by pressure on bullet-shaped nut 21) and secure the stopper in the holder, with expanding washer 20 being located in the pipe.

vi) The worker then firmly grasps handle 16 to prevent rod 17 from rotating, and tightens wing nut 14, causing sleeve 18 to bear on flat washer 19, which squeezes expanding washer 20 against bullet shaped nut 21. The expansion of expanding washer 20 stops the flow of gas from the pipe, and the operation is complete.

It has been observed in tests that from start to finish, steps (i)–(vi) detailed above may be performed within 10–15 seconds, by a single individual.

It is to be understood that the examples described above are not meant to limit the scope of the present invention. It is expected that numerous variants will be obvious to the person skilled in the tool making field, without any departure from the spirit of the present invention. The appended claims, properly construed, form the only limitation upon the scope of the present invention.

I claim:

1. A device for stopping the flow of fluid under pressure from an open-ended pipe including:

i) clamp means adapted to grasp said pipe adjacent its open end;

ii) stopper holder means attached to and extending from said clamp means and being alignable with the open end of said pipe; and iii) stopper means adapted to be held by said stopper holder means in a position aligned with the open end of said pipe and insertable from said aligned position into said pipe to stop the flow of fluid from said pipe, said stopper means comprising a threaded rod having a handle at one end and an expandable washer at the other end, said expandable washer being seated in a first nut adapted to be inserted into said open pipe, there being a flat washer above said expandable washer on said rod and a first sleeve on said threaded rod above said flat washer, for transmitting compressive forces from the handle end of said stopper means to said flat washer, thereby to deform said expandable washer and cause said expandable washer to seal against the inner surface of a pipe and stop the flow of fluid from said pipe, said stopper holder means being adapted to hold said stopper means securely in a first position outside said pipe and aligned with the open end thereof, and a second position with a portion of said stopper means inserted in said pipe; wherein above said first sleeve on said stopper means is located a collar having radially outwardly extending means for engaging said stopper holder means when said stopper means is in said second position, said stopper holder means being adapted by the provision of slots to engage said engaging means.

2. A device as claimed in claim 1, wherein above said collar is a second sleeve, above which is threaded a second nut preferably a wing nut, tightening of which causes said compressive forces to be transmitted through said second sleeve, said collar and said first sleeve, to deform said expandable washer.

3. A device as claimed in claim 2, wherein said first nut adapted to be inserted into said open end of said pipe is substantially bullet shaped.

4. A device as claimed in claim 1, wherein said stopper holder is substantially cylindrical, and is swivelly hinged to a post extending outwardly from said clamp means in a direction substantially parallel to the central axis of a pipe to be clamped, said holder being provided with means extending below the level of said pipe to limit the swivelling of said holder when said holder is in alignment with said pipe.

5. A device as claimed in claim 4, wherein locking means are provided in association with said post to releasably lock said holder in position over said pipe.

6. A device as claimed in claim 5, wherein said locking means comprises a bolt threaded to the top end of said post and tightenable against the hinges of said stopper.

7. A device as claimed in claim 6, wherein said means extending from said holder below said pipe is an arcuate skirt secured to the lower end of said holder and dimensioned to fit against the outer surface of a pipe.

8. A device as claimed in claim 7, wherein said holder is provided with a central bore into which a said stopper will fit, said bore being narrowed at its upper end to permit said stopper to be withdrawn into but not through said holder whilst said holder is swivelled over a said pipe.

9. A device as claimed in claim 8, wherein said holder is provided with a first slot extending its length and communicating with said bore, to permit said first sleeve of said stopper to slip through said slot into said bore, thereby to insert said stopper into said holder.

10. A device as claimed in claim 9, wherein said stopper holder is provided with a second, narrower slot on its opposite side relative to said first slot, and extending from the end of said holder remote from said clamp about halfway down said holder, there being arcuate slots extending part way around the circumference of said holder from said first and second slots at the lowermost level of said second slot, and short upwardly directed slots at the end of said arcuate slots, and wherein said collar on said stopper is provided with outwardly extending flukes engageable with said first, second, arcuate, and short slots, to pass down said first and second slots, part way around said holder by said arcuate slots, and up said short upwardly directed slots to retain said stopper in said second position against a flow of fluid under pressure.

11. A device as claimed in claim 1, wherein said clamp is locking pliers, and said fluid under pressure is natural gas.

12. A device as claimed in claim 2, wherein said stopper holder is substantially cylindrical, and is swivelly hinged to a post extending outwardly from said clamp means in a direction substantially parallel to the central axis of a pipe to be clamped, said holder being provided with means extending below the level of said pipe to limit the swivelling of said holder when said holder is in alignment with said pipe.

13. A device as claimed in claim 3, wherein said stopper holder is substantially cylindrical, and is swivelly hinged to a post extending outwardly from said clamp means in a direction substantially parallel to the central axis of a pipe to be clamped, said holder being provided with means extending below the level of said pipe to limit the swivelling of said holder when said holder is in alignment with said pipe.

* * * * *